March 10, 1931. G. M. CLASS 1,795,594
TOOL FOR TURNING TAPER BOLTS
Filed Oct. 3, 1928 4 Sheets-Sheet 1
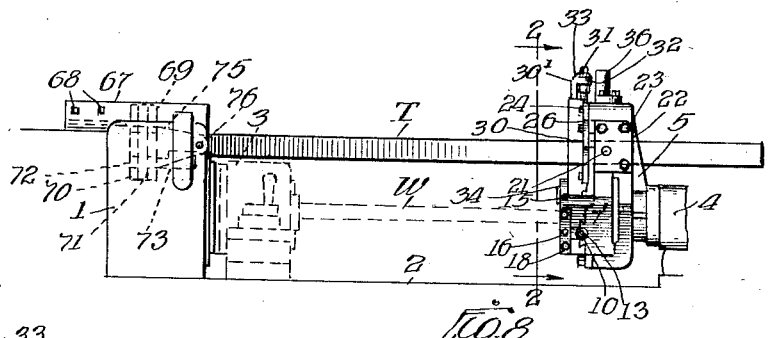
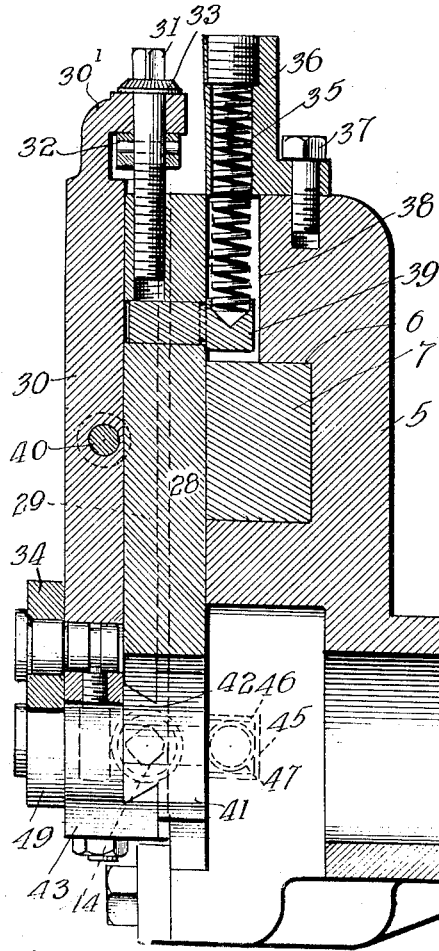
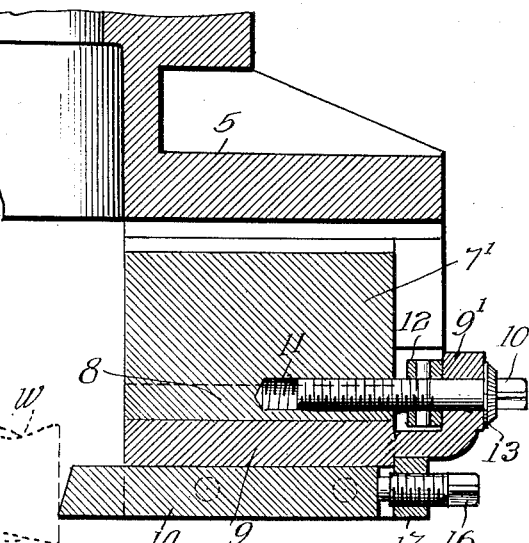
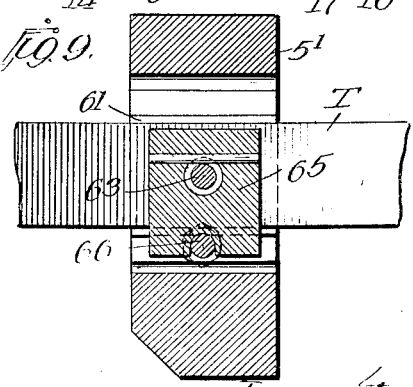
Witness:
Harry R. L. White
Inventor:
George M. Class
By Fisher, Clapp, Soans & Pond,
Attys.

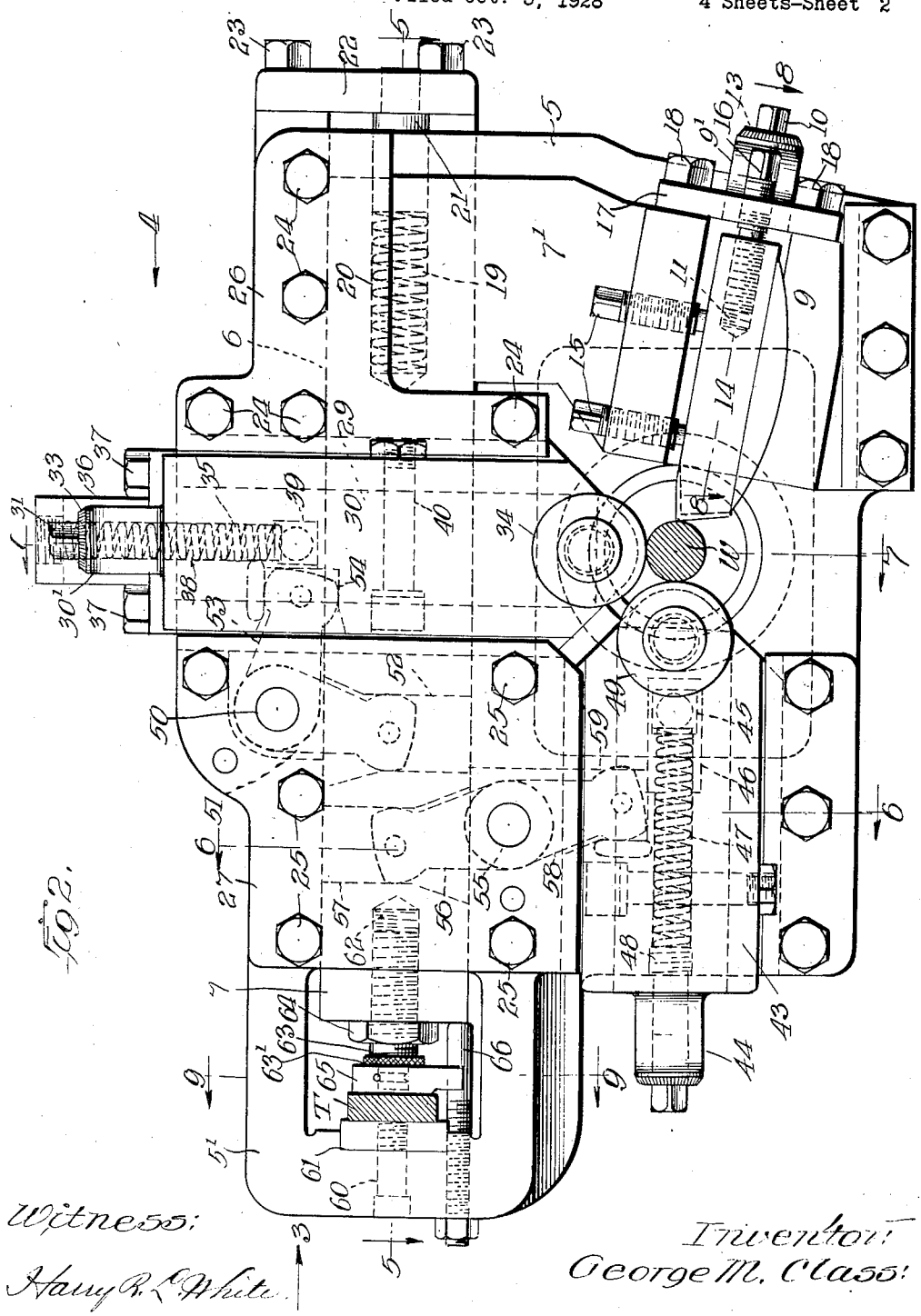

March 10, 1931. G. M. CLASS 1,795,594
TOOL FOR TURNING TAPER BOLTS
Filed Oct. 3, 1928 4 Sheets-Sheet 3
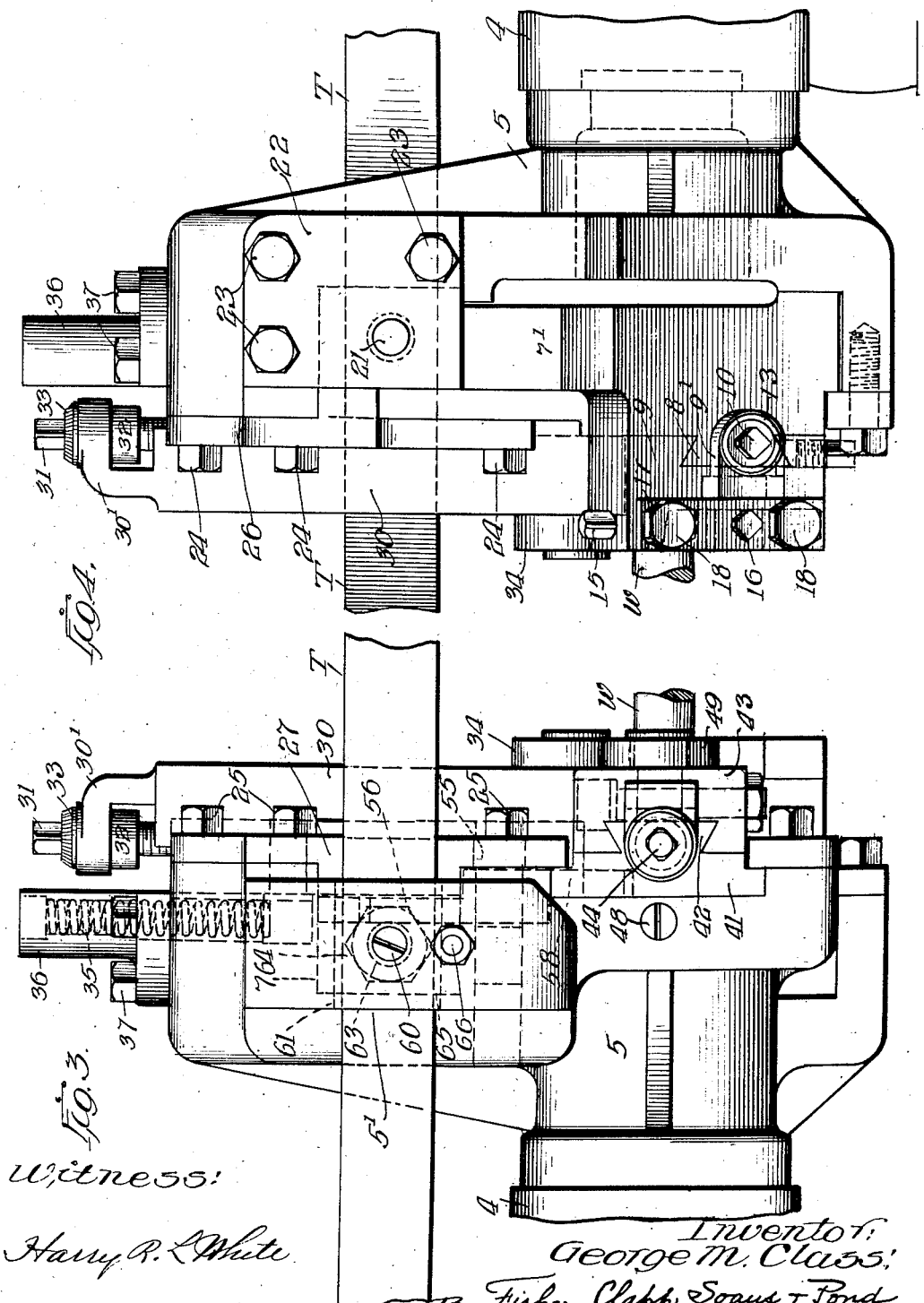
Witness:
Harry R. L. White
Inventor:
George M. Class
By Fisher, Clapp, Soans + Pond
Attys.

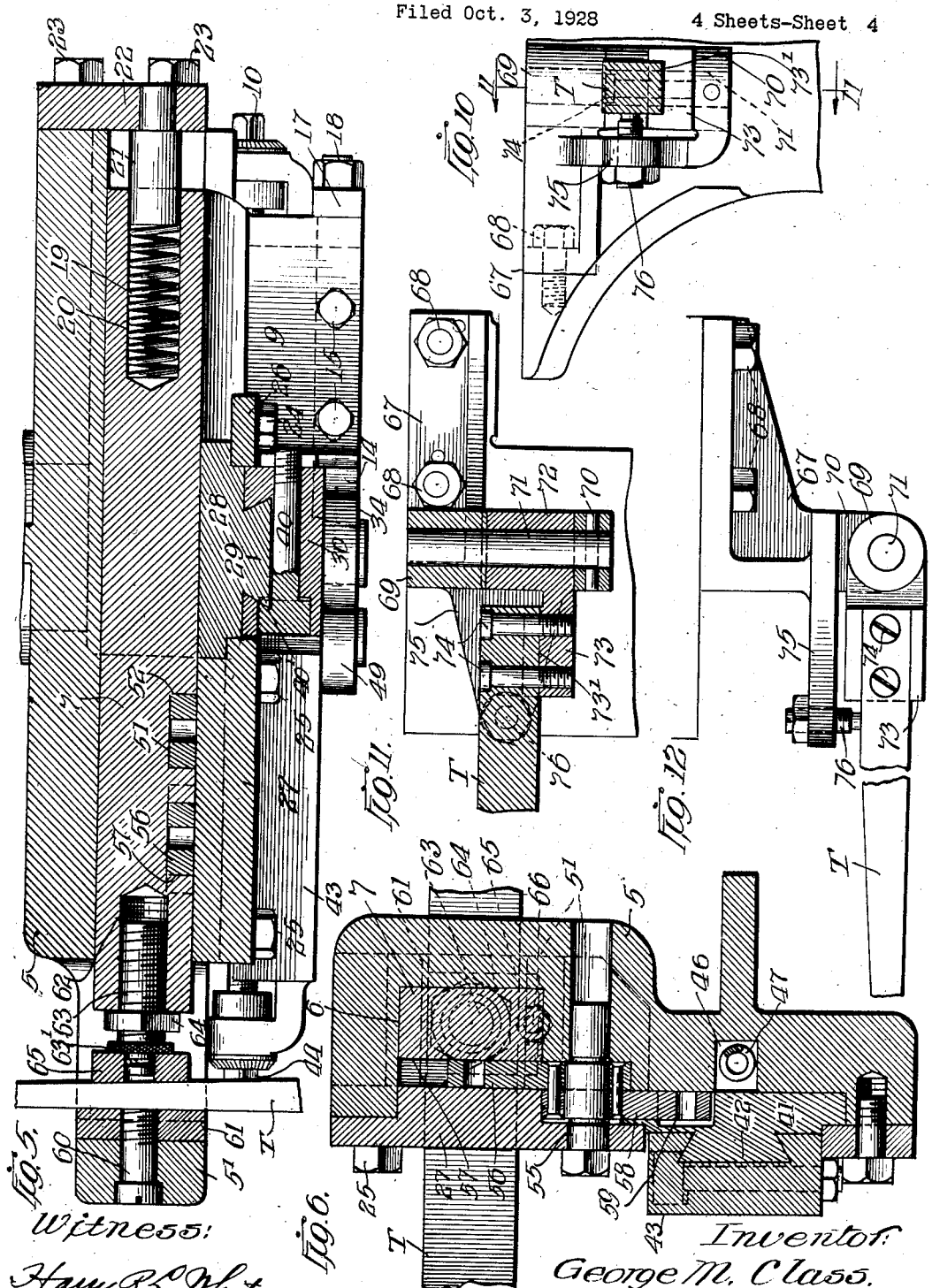

Patented Mar. 10, 1931

1,795,594

UNITED STATES PATENT OFFICE

GEORGE M. CLASS, OF MADISON, WISCONSIN, ASSIGNOR TO GISHOLT MACHINE COMPANY, OF MADISON, WISCONSIN, A CORPORATION OF WISCONSIN

TOOL FOR TURNING TAPER BOLTS

Application filed October 3, 1928. Serial No. 310,113.

This invention relates to a device in the nature of a lathe attachment for turning taper bolts from a rod or bar of steel held and revolved in a lathe chuck. Taper turning tools of this character are usually mounted on a turret that is slidable on the lathe bed toward and from the chuck, and include a cutting tool and one or more rollers engaging the work on the opposite side of the latter from the cutting tool to oppose the lateral thrust of the latter on the work, and means for effecting a uniform outward movement of the tool and the roll or rollers as the turret advances.

Among the objects of the present invention are to provide a taper turning tool of this character wherein the cutting tool and rollers will be constantly urged toward the work under spring pressure, and will be gradually moved outwardly against the spring through the agency of mechanism actuated by a taper bar disposed parallel with the work; to provide in such a tool improved means for securing exactly equal simultaneous outward movements of the cutter and the rollers so as to insure uniform and constant engagement of the cutter and rollers with the work throughout the entire extent of the turning operation; to provide improved means for mounting and supporting the taper bar against lateral deflection during the turning operation; to provide improved micrometer adjustments for the cutter and roller slides enabling said slides to be accurately set on the work; to provide a tool eliminating all lost motion resulting from backlash; and, generally, to provide an improved and highly efficient taper turning tool of the character specified.

Other objects and attendant advantages of the invention will become apparent to persons skilled in the art as the same becomes better understood by reference to the following detailed description, taken in connection with the accompanying drawings in which I have illustrated a practical and approved embodiment of the principle of the invention, and wherein—

Fig. 1 is a side elevation of a portion of a turret lathe equipped with my improved taper turning tool;

Fig. 2 is a face view of the tool, in cross-section through the taper bar and the work on the line 2—2 of Fig. 1;

Fig. 3 is an end elevation of Fig. 2 viewed from the left of the latter figure;

Fig. 4 is an end elevation of the tool, viewed from the right of Fig. 2;

Fig. 5 is a horizontal longitudinal section taken on the line 5—5 of Fig. 2, looking downwardly;

Fig. 6 is a vertical transverse section taken on the line 6—6 of Fig. 2;

Fig. 7 is a vertical transverse section in the vertical plane of the axis of the work, taken on the line 7—7 of Fig. 2;

Fig. 8 is a substantially horizontal section through the cutting tool and its slide taken on the line 8—8 of Fig. 2, looking downwardly;

Fig. 9 is a vertical transverse section, taken on the line 9—9 of Fig. 2;

Fig. 10 is a front elevation of the taper bar supporting bracket, showing a fragment of the headstock of the lathe to which the bracket is attached, showing the taper bar in cross-section;

Fig. 11 is a vertical section of the taper bar supporting bracket taken on the line 11—11 of Fig. 10;

Fig. 12 is a top plan view of the taper bar supporting bracket and the taper bar, the latter being broken out.

Referring first to Fig. 1, 1 designates generally the headstock frame, 2 the bed, 3 the rotary chuck, and 4 a fragment of a turret slidable on the ways of the bed toward and from the chuck 3. These parts are not illustrated in detail as they may represent the corresponding parts of any ordinary turret lathe. W represents the work to be turned, consisting of a rod or bar securely held and rotated by the chuck 3; and T represents the taper bar rigidly mounted at one end on the headstock frame 1 and lying generally parallel with the work W.

5 designates as an entirety a body member bolted or otherwise secured to the turret 4. In the face of this body member is a horizontal groove or slideway 6 in which is slidably fitted a bar 7 that is formed at one end with a depending extension 7' (Fig. 4), on the front face of which is a dovetail slideway 8 on which is slidably mounted a tool carrying slide 9 that, as shown in Figs. 2 and 8, is provided with a micrometer adjustment on the slideway 8 consisting, as shown in Fig. 8, of a rearwardly bent apertured shank 9' on the tool slide 9, and an adjusting screw 10 engaged with a tapped hole 11 in the slideway 8, the screw 10 being held against endwise movement by inner and outer collars 12 and 13. Seated in a longitudinal channel in the slide 9 is the cutting tool 14 locked in place by clamp screws 15 and roughly adjustable toward and from the work by an adjusting screw 16 threaded into a strip 17 that is secured to the outer end of the tool slide 9 by bolts 18. The main slide 7 is continuously urged in a direction to carry the cutting tool 14 toward the work W by a thrust spring 19 (Fig. 5) housed within a socket 20 in the right hand end of the slide and exerting an outward thrust on a plunger 21 that is secured in a strip 22 attached to the right hand end of the main body member 5 by screws 23.

Attached to the front face of the body 5 by screw bolts 24 and 25 and overlying the front face of the tool slide 7 are a pair of plates 26 and 27 respectively, the inner opposed edges of which are channeled to form a slideway for a vertical roller slide that comprises a base slide 28 having a dovetail slideway 29 on its outer face and an outer slide 30 (Fig. 7) connected to the base slide 28 by a micrometer adjustment comprising an inwardly bent shank 30' on the upper end of roller slide 30, an adjusting screw 31 threaded into a tapped hole in base slide 28, and clamp collars 32 and 33 on the adjusting bolt 31. On the lower end of slide 30 is journaled a roller 34 adapted for engagement with the top of the work W. The compound roller slide 28, 30 is normally urged inwardly or downwardly under the thrust of a compression spring 35 that is mounted in a bracket 36 attached to the top of the body 5 by screws 37, said screw extending downwardly in a vertical slot 38 in the front face of the body 5 and footing against the head of a pin 39 that is secured by a drive fit in a hole in the base slide 28. A clamp bolt 40 (Fig. 5) extending transversely through the outer slide member 30 is formed with a notch 40' in its head engaging the dovetail 29 to lock the outer slide 30 on the inner slide 28 after accurate adjustment has been made.

A roller and roller slide construction similar to that last described is provided on the body member at a point substantially diametrically opposite the cutting tool 14. Referring to Fig. 6, 41 designates the inner or base slide formed with a dovetail slideway 42, and 43 is the outer or roller carrying slide equipped with the same micrometer adjustment designated as an entirety by 44 in Fig. 2, as that previously described. A pin 45 (Fig. 2) corresponding functionally to the pin 39 has its head slidable in a groove or channel 46 in the outer face of the body 5 and forming a footing for a thrust spring 47. The main portion of spring 47 lies in a hole formed in the body member 5 and its outer end abuts against a screw 48 closing the outer end of said hole. Journaled on the inner end of the outer slide 43 is a roller 49 urged into contact with the work W by the spring 47.

Provision is made to effect simultaneous and equal outward and inward movements of the cutting tool 14 and the work supporting rollers 34 and 49 by the following mechanism. At 50 is pivoted in the body member 5 above the slide 7 an elbow lever having arms of equal lengths. The depending arm 51 of this lever extends into a transverse slot 52 in the front face of the slide 7, and the substantially horizontal arm 53 of this lever extends into a recess 54 in the vertical base slide 28. Also centrally pivoted at 55 in the body member 5 below the slide 7 is a lever having an upstanding arm 56 that enters a transverse slot 57 in the slide 7 and also a depending arm 58 of the same length as the arm 56 engaged with a notch 59 in the base slide 41. From this construction it will readily be seen that an inward or outward movement of the slide 7 and its extension 7' toward or from the work will be accompanied by exactly equal inward and outward movements of the two roller slides. The outward movements of the three slides are effected from the taper bar T by the following described means. The body member 5 is formed on its left end, viewing Figs. 2 and 5, with a hollow rectangular frame 5', and to the outer vertical limb of this frame is secured by a screw 60 a hardened bearing plate 61 adapted to bear against the outer straight side of the taper bar T and form a lateral rest or support for the latter. In a tapped socket 62 in the left hand end of the slide 7 is a screw 63 formed with a milled head 63' for adjustment thereof and carrying a lock nut 64. On the reduced portion of the screw lying outside of the head 64 is loosely mounted and keyed a hardened steel bearing block 65 that, as shown in Fig. 5, is formed on its outer side with a bearing surface tapered to correspond with the taper of the inner side of the taper bar T. As shown in Fig. 2, the lower end of the bearing block 65 is forked to straddle a bolt 66 mounted in the lower portion of the frame extension 5', so as to prevent any turning movement of the bearing block 65 while permitting accurate adjustment thereof by the adjusting screw 63.

Referring to Figs. 1, 10, 11 and 12 I have shown therein a preferred means for mounting the taper bar T on the headstock frame of the lathe. Referring thereto, 67 designates a bracket that is strongly secured by screws 68 to the headstock frame, and is formed with vertical spaced bearings 69 and 70 between which is mounted on a pivot bolt 71 a hinge bracket 72 to a forwardly extending arm 73 of which is rigidly secured by screws 74 the rear end or shank of the taper bar, the lower side of the latter occupying a seat 73' in the arm 73. Bracket 67 has a forwardly extending arm 75 integral with the lower bearing 70 and disposed laterally opposite the arm 73 and carrying an adjusting screw 76 bearing at its inner end on the inner side of the shank of the taper bar. By turning up the adjusting screw 76, the outer side of the taper bar is brought into contact with the inner side of the thrust block 61.

In the operation of the device, the work having been chucked, the cutter and roller slides are adjusted accurately to bring the cutting tool and thrust rollers into proper relation to the surface of the work, and the diameter of the cut to be taken is determined by adjustment of the screw 63, the latter being adjusted inwardly for a relatively smaller diameter cut and outwardly for a relatively larger diameter cut. As the turret is brought forward, the head 65 slides over the tapered side of the turret bar, forcing the cutter slide 7 and the cutter tool 14 outwardly; the back pressure being taken by the thrust block or plate 61. As the slide 7 is thus gradually moved the tool cuts a taper on the work and by means of the lever connections from the cutter slide 7 to the roller slides, the latter are also moved out to the same extent, supporting the work all along the taper cut. At the end of the cut, the turret is returned to starting position, and the three springs 19, 35 and 47 return the cutter and roller slides to starting position.

An important advantage of a taper cutting tool of this kind lies in the fact that at all times when the tool is cutting there is no lost motion due to backlash, since the springs hold the slide 7 at all times pressed firmly against the taper bar, the latter acting only to force the slides out against the thrust of the springs.

I claim—

1. A self-contained taper turning attachment for lathes, comprising, in combination, a stationary bar adapted to be attached to the lathe and formed with a longitudinally tapered surface, a body member mounted to travel lengthwise of said bar, a slide mounted in said body member carrying a tool holder and tool, said slide bearing against said tapered surface, a work-steadying member slidably mounted in said body member and coupled to said slide, spring means mounted on said body member constantly urging said slide against said tapered surface and said tool and work-steadying member against the work, and means on said body member affording lateral backing to said taper bar against the thrust of said slide thereon.

2. A self-contained taper turning attachment for lathes, comprising, in combination, a stationary bar adapted to be attached to the lathe and formed with a longitudinally tapered surface, a body member mounted to travel lengthwise of said bar, a slide mounted in said body member carrying a tool holder and tool, said slide bearing endwise against said tapered surface, a thrust spring footed at one end against said body member and at its other end against said slide, said spring constantly urging said slide against said tapered surface and the tool against the work, an abutment on said body member against which said bar reacts, work-steadying rollers slidably mounted in said body member, and coupling means between said rollers and said slide effecting simultaneous and equal outward movements of said rollers and tool relatively to the work.

3. In a taper-turning tool of the character described, the combination with a stationary bar formed with a longitudinally tapered surface, of a body member mounted to travel lengthwise of said bar, a slide mounted in said body member carrying a tool holder and tool, said slide bearing endwise against said tapered surface, a second slide mounted in said body member carrying a thrust roller, a spring between said body member and said first-named slide constantly urging the latter against said tapered surface and the tool against the work, an abutment on said body member against which said bar reacts, a spring between said body member and said second slide constantly urging the latter and its roller toward the work, and means connecting said slides through which movement of either is transmitted to the other to the same extent and in the same direction relatively to the work.

4. In a taper-turning tool of the character described, the combination with a stationary bar formed with a longitudinally tapered surface, of a body member mounted to travel lengthwise of said bar, a slide mounted in said body carrying a tool holder and tool, said slide bearing endwise against said tapered surface, a plurality of roller slides mounted in said body member and each carrying a thrust roller, a spring between said body member and said first-named slide constantly urging the latter against said tapered surface and the tool against the work, an abutment on said body member against which said bar reacts, a plurality of springs disposed respectively between said body member and said roller slides constantly urging the latter toward the work, and means connecting all of said slides through which movement of any slide is transmitted to the others to the same extent and in the same direction relatively to the work.

5. In a taper-turning tool of the character described, the combination with a stationary bar formed with a longitudinally tapered surface, of a body member mounted to travel lengthwise of said bar, a slide mounted in said body member carrying a tool holder and tool, said slide bearing endwise against said tapered surface, a plurality of roller slides mounted in said body member and each carrying a thrust roller, a spring between said body member and said first-named slide constantly urging the latter against said tapered surface and the tool against the work, an abutment on said body member against which said bar reacts, a plurality of springs disposed respectively between said body member and said roller slides constantly urging the latter toward the work, and a plurality of levers pivoted on said body member, said levers having one arm engaged with said first-named slide and their other arms engaged respectively with said roller slides.

6. A self-contained taper turning attachment for lathes, comprising, in combination, a stationary taper bar formed with a flat tapered side adapted to be attached to the lathe, a body member mounted to travel lengthwise of said taper bar, a slide mounted in said body member and carrying on one end thereof a work engaging tool, an adjusting screw mounted in and lengthwise of the other end of said slide, a bearing member swiveled on said screw and formed with a flat tapered side registering with the flat tapered side of said taper bar, a spring between said body member and slide constantly urging said bearing member against said bar and the work engaging tool against the work, means for locking said bearing member against turning movement on said screw, and means on said body member affording lateral backing to said taper bar against the thrust of said slide thereon.

7. In a taper-turning attachment for lathes, the combination of a taper bar, means for pivotally supporting the same at one end thereof to swing laterally, a body member adapted to travel lengthwise of said taper bar, a slide on said body member actuated in one direction through sliding contact with said taper bar, a tool holder and tool mounted on said slide, a spring constantly urging said slide against said taper bar and the tool against the work, means on said body member affording lateral backing to said taper bar against the thrust of said slide thereon, and means independent of said spring for adjusting the taper bar laterally into contact with said taper bar backing means.

8. In a taper turning attachment for lathes, the combination of a bracket attachable to the lathe head-stock, a taper bar vertically pivoted on said bracket to swing laterally, a body member adapted to travel lengthwise of said taper bar, a slide on said body member actuated outwardly through sliding contact with said taper bar, a tool holder and tool mounted on said slide, a spring constantly urging said slide inwardly against said taper bar and the tool against the work, a bearing plate on said body member affording lateral backing to said taper bar against the thrust of said slide thereon, and an adjusting screw in said bracket bearing against said taper bar for shifting the latter into contact with said bearing plate.

GEORGE M. CLASS.